Figure 1:
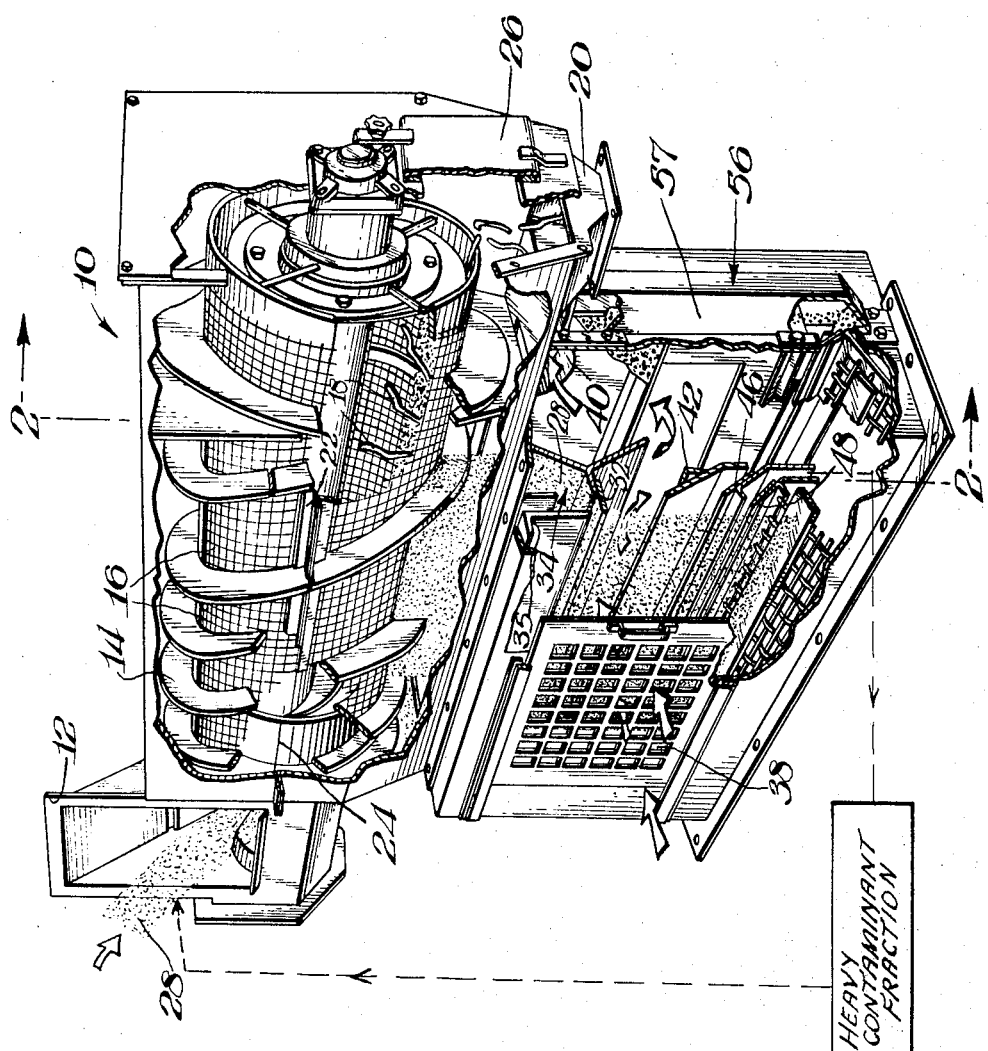

Feb. 13, 1968  C. H. BRADLEY, JR  3,368,677
ABRASIVE SEPARATOR

Filed Sept. 8, 1964  2 Sheets-Sheet 1

INVENTOR
*Charles H. Bradley, Jr.*

BY *Connolly and Hutz*
ATTORNEYS

Feb. 13, 1968   C. H. BRADLEY, JR   3,368,677
ABRASIVE SEPARATOR
Filed Sept. 3, 1964   2 Sheets-Sheet 2

INVENTOR
Charles H. Bradley, Jr.
BY Connolly and Hutz
ATTORNEYS

# United States Patent Office 3,368,677
Patented Feb. 13, 1968

3,368,677
ABRASIVE SEPARATOR
Charles H. Bradley, Jr., Hagerstown, Md., assignor to The Pangborn Corporation, Hagerstown, Md., a corporation of Delaware
Filed Sept. 8, 1964, Ser. No. 394,664
1 Claim. (Cl. 209—135)

This invention relates to a separator for separating abrasive particles from a mixture of abrasive contaminant which mixture is formed during abrasive blast cleaning operations.

In abrasive blast cleaning operations, a high velocity stream of abrasive particles is propelled against workpieces to remove therefrom sand or scale or to obtain a specific finish. To assure the rate and uniformity of finish, the size of abrasive particles must be carefully controlled during the blasting operation. Any contaminant such as core rods, wires, metal flash, scrap, scale and broken abrasive particles picked up by the abrasive during blasting must accordingly be removed from the contaminant mixture before reusing the abrasive. In many blast cleaning systems, large pieces of scrap are removed from the abrasive contaminant mixtures by screen grates strategically located within the abrasive circulation system. After blasting, screw conveyors move the abrasive-contaminant mixture from the collection hopper to an endless belt bucket elevator which supplies a continuous flow of abrasive to a separator for separating the contaminant from the reuseable abrasive particles.

The conventional separating systems are usually operated in one or two stages by either atempting to separate the abrasive particles directly from the contaminant mixture (one stage) or by first separating the lighter contaminant, such as fines, from the mixture and then attempting to separate the abrasive particles from the remaining mixture (two stage). These systems however have the drawback that either the yield of recovery of abrasive particles is too low, or that too much contaminant is included with the recovered abrasive particles. Where the yield of recovery is too low, i.e. too much potentially useful abrasive particles remain with the discarded contaminant, the cost of replenishing the supply is obviously increased. On the other hand, where too much contaminant is mixed with the recovered abrasive and then reused, the life of the wear parts of the abrasive blasting machine is reduced and maintainance costs are increased.

One object of this invention therefor is to provide an efficient separator for removing abrasive particles from abrasive contaminant mixtures.

Figure 2:
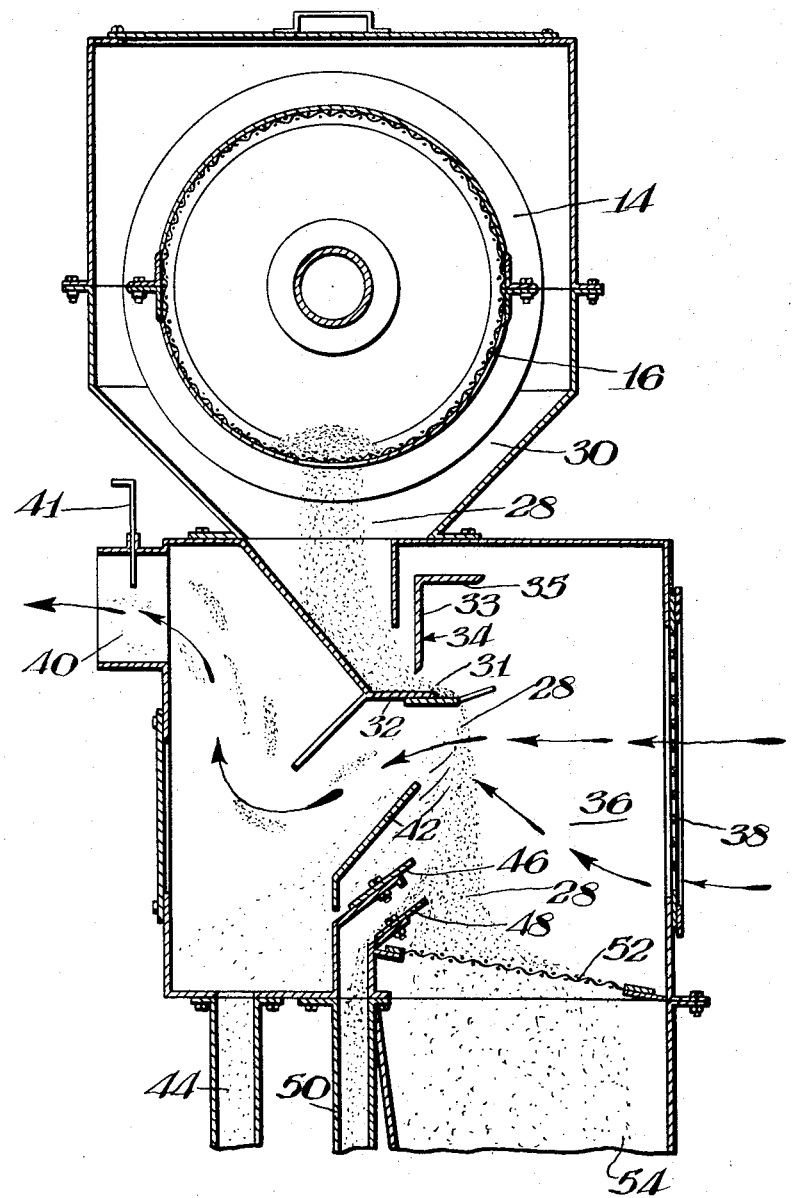

Other objects and advantages of this invention will become more apparent from a study of the following description and drawings wherein:

FIG. 1 is a perspective partly broken away of one embodiment of this invention; and FIG. 2 is taken along line 2—2 of FIG. 1.

The present invention overcomes the drawbacks of prior separators by providing a plurality of skimmer plates to cause the abrasive contaminant mixture to undergo three stages of separation. In the first stage of separation, the airborne or lightweight particles are removed from the mixture by an air curtain flowing across the separation zone of the separator into which the abrasive contaminant mixture is falling. The air curtain also diverts the abrasive contaminant stream, and intermediate weight contaminant, such as sand or wires as well as heavier dust, is blown between a first and second skimmer plate with the remaining mixture being slightly diverted from its free fall. The remaining mixture then undergoes another or final stage of separation in which heavier contaminant, such as larger particles of sand and broken particles of abrasive, are carried between a second and third skimmer plate with the pure abrasive particles falling directly into the abrasive collection hopper for reuse.

Referring specifically to FIG. 1 which shows the abrasive separator 10, the contaminant mixture 28 is fed by an elevator (not shown) to the inlet 12 where it is carried by screw conveyor 14 to the distributing zone of the separator 10. A wire mesh scalping drum 16 distributes the mixture along the entire width of the separator 10 while removing and discharging coarse scrap 18 into a collector 20 at the extreme end of the separator 10. Access door 26 facilitates the removal of scrap 18. Scalping drum 16 includes a removable drum section 22 to provide easy access for maintainance of scalping drum 16. Advantageously, the scalping drum housing can also be disassembled along its horizontal center line 24 to simplify further its maintainance and service.

As more clearly shown in FIG. 2 the contaminant mixture 28 falls to the bottom of the distributing zone 30 toward lip 32. Lip 32 forms a metering slot 31 with metering gate 34 of the type described in copending application S.N. 214,271, filed Aug. 2, 1962, now Patent No. 3,227,327. Metering gate 34 is adjustable to insure a uniform flow of particles over lip 32. When the metering slot 31 is clogged or jammed, vane 33 of gate 34 is rotated away from lip 32 to unclog the slot, and vane 35 is simultaneously rotated in its place to create a new metering slot of the same size as the prior slot. From the metering slot 31, the contaminant mixture 28 flows into the separation zone 36 of separator 10.

Advantageously, separator 10 also includes a recirculating system 56 which is shown in FIG. 1. When more contaminant mixture 28 is fed to metering slot 31 than can pass through the slot 31, the excess mixture falls into an overflow conduit 57 for recirculation back to scalping drum 16.

When contaminant mixture 28 falls into separation zone 36 it is subjected to three stages of refining in which the mainstream of mixture 28 is divided into four streams. This division into streams is accomplished by utilizing an air curtain in combination with a number of strategically located skimmer plates. The air curtain, as later described, diverts contaminant mixture 28 from its straight free fall by flowing across the falling mixture. Since contaminant mixture 28 contains various particles of different weight, from the lightweight dust to the heavyweight abrasive particles, the affect of the air curtain varies in accordance with the weight of the individual particles in mixture 28. Accordingly, the lightest weight particles are substantially diverted from free fall, while the heavy abrasive particles are relatively unaffected by the air curtain.

As shown in FIGS. 1 and 2 the air curtain flows through inlet 38 across separating zone 36 and is drawn through outlet or vent 40 to a dust collector (not shown). Blast gate 41 in vent 40 regulates the size of the outlet. As the air curtain moves across the separation zone 36 it diverts the free fall of the contaminant mixture 28, as described above. The lighter particles, such as dust or fines, which are airborne are drawn through outlet 40 into the dust collector. Some of the heavier particles in this stream slide down skimmer plate 42 into the conduit 44 which leads to the fine refuse hopper (not shown). The remaining mixture 28 continues to fall toward the bottom of separation zone 36. However, the lighter particles of this remaining mixture, that is the intermediate weight particles of the original mixture, are diverted from free fall enough by the air curtain that mixture 28 undergoes another stage of separation. This stage is accomplished by a second skimmer plate 46 which is adjustable to control its amount of protrusion into the diverted mixture 28. The intermediate weight particles are separated into a stream between skimmer plate 42 and skimmer plate 46 away from the mainstream of mixture 28. These intermediate weight particles, such as heavier particles of dust, sand, dirt and scale, slide down the skimmer plate 46 and are also collected in the fine refuse hopper 44. The remaining mixture 28 is then subjected to the final step of separation. Adjustable skimmer plate 48 divides the remaining mixture into a pair of streams. One stream contains heavy contaminants, such as sand and broken abrasive particles, which flow between skimmer plates 46 and 48 into a heavy refuse conduit 50. In an advantageous form of this invention this heavy contaminant stream falls into a recirculating spout (schematically shown) to recirculate this stream through the separation zone 36 so that usable abrasive particules which might be in the stream can be removed. The remaining stream which was divided by plate 48 contains pure abrasive particles which continue to flow directly downward through screen tray 52 into the abrasive storage bin 54 where the pure abrasive particles are collected for re-use.

Obviously, many modifications and variations of the present invention are possible in light of the above teachings. It is therefore to be understood that within the scope of the appended claim the invention may be practiced otherwise than as specifically described.

What is claimed is:

1. A separator for separating abrasive blasting particles from an abrasive contaminant mixture comprising a housing defining a separating zone and metering means for introducing the mixture into the upper portion of the separating zone, means for introducing a single air curtain through a first wall of the housing and across the separating zone, outlet means in a second wall of the housing for the air curtain, a first skimmer plate in the separating zone intermediate the first and second walls positioned so that the air curtain carries lightweight contaminant thereover and permits heavier particles thereof to slide down the first skimmer plate and diverts the fall of the remaining mixture, second and third skimmer plates vertically spaced from each other in the separating zone below the first skimmer plate, the second and third plates defining a passage for heavy contaminant diverted by the air curtain and permitting pure abrasive particles to fall past the third skimmer plate, means for collecting the pure abrasive particles for re-use, means connected to deliver the heavy contaminant from the passage for reintroduction into the upper portion of the separating zone with the contaminant mixture, the second wall and the vertically spaced first and second splitter plates defining a common collection reservoir for the heavier particles of the lightweight contaminant and intermediate weight particles which pass between the first and second skimmer plates, the reservoir being positioned beneath the outlet means for the air curtain, and means to remove contaminant material from the reservoir.

References Cited
UNITED STATES PATENTS

| | | | |
|---|---|---|---|
| 1,506,494 | 8/1924 | Lindsay | 209—137 |
| 2,866,547 | 12/1958 | Gladfelter | 209—33 |
| 3,087,615 | 4/1963 | Powell | 209—32 X |
| 3,227,327 | 1/1966 | Bradley | 209—32 X |

FOREIGN PATENTS

| | | |
|---|---|---|
| 2,700 | 1888 | Great Britain. |

FRANK W. LUTTER, *Primary Examiner.*